(No Model.) 2 Sheets—Sheet 1.

J. R. CAMPBELL.
AUTOMATIC CAR HOLDER FOR HOISTING CAGES.

No. 569,999. Patented Oct. 27, 1896.

Witnesses
James B. Smith
Wm B. Thomas

Inventor
Julius R. Campbell,
By Edwin Guthrie
Attorney

THE NORRIS PETERS CO., PHOTO-LITHO., WASHINGTON, D. C.

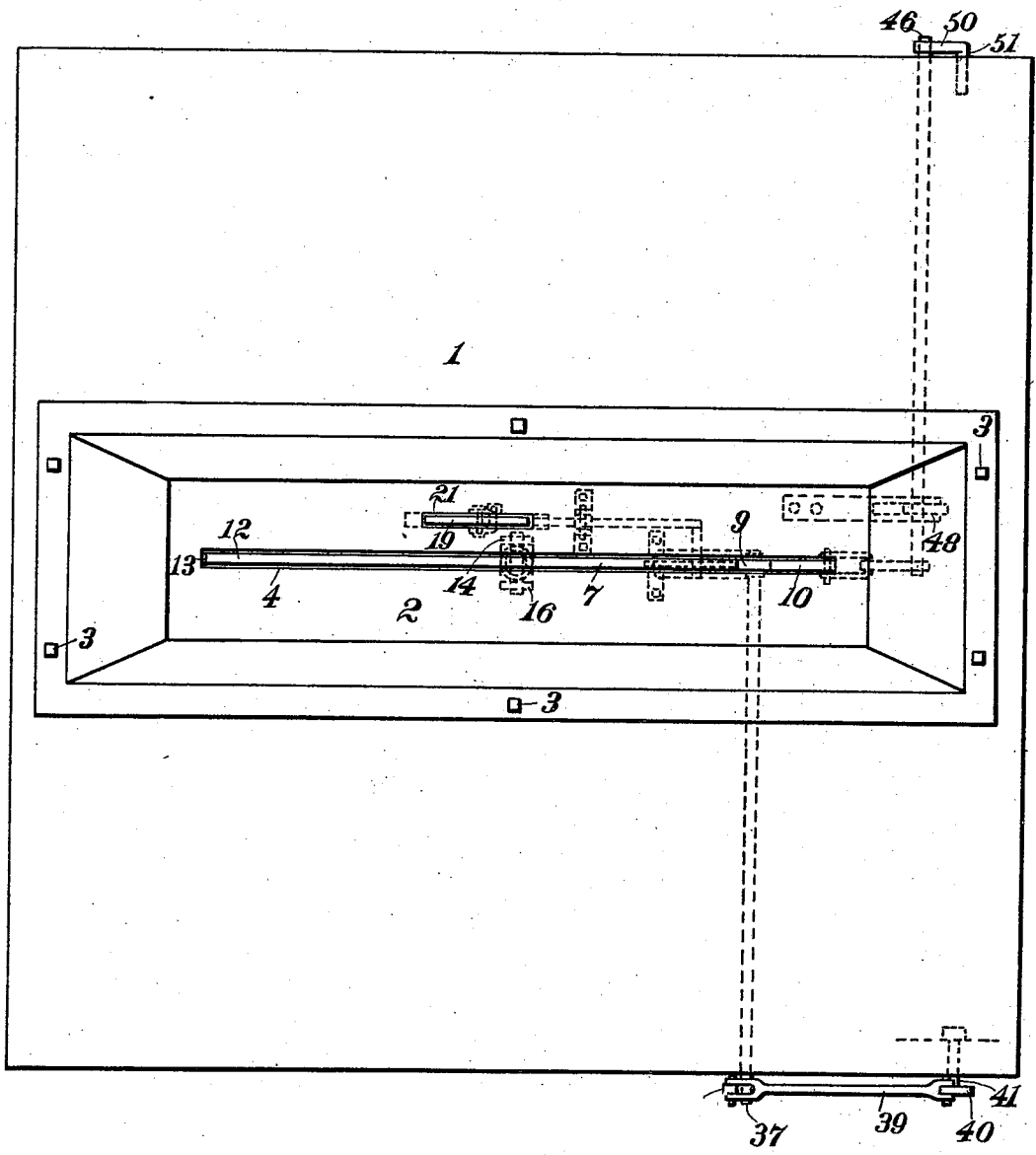

UNITED STATES PATENT OFFICE.

JULIUS ROY CAMPBELL, OF LITCHFIELD, ILLINOIS.

AUTOMATIC CAR-HOLDER FOR HOISTING-CAGES.

SPECIFICATION forming part of Letters Patent No. 569,999, dated October 27, 1896.

Application filed February 15, 1896. Serial No. 579,340. (No model.)

*To all whom it may concern:*

Be it known that I, JULIUS ROY CAMPBELL, a citizen of the United States, residing at Litchfield, in the county of Montgomery and State of Illinois, have invented certain new and useful Improvements in Automatic Car-Holders for Hoisting-Cages; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to automatic car-holders for hoisting-cages, and has for its object the improvement of devices for automatically engaging the axles or other suitably constructed and arranged parts of car-trucks whereby the cars may be secured in a certain position upon the floor of an elevator-cage while being raised or lowered between different levels.

My invention consists, essentially, of a pivoted dog supported by a coiled spring and having a recess to receive the axle of a truck and inclined portions enabling the axles to pass over and to depress the ends of the dog, together with various lever-operated mechanical elements by the action of which the dog is withdrawn against the force of the spring from engagement with the truck, so that the latter may be rolled off the cage, when desired, and devices for releasing the dog from its retracted position in order that it may engage a second truck taking the place of the first. Each constituent part of my invention is described in detail and its office fully explained hereinbelow.

Figure 1:
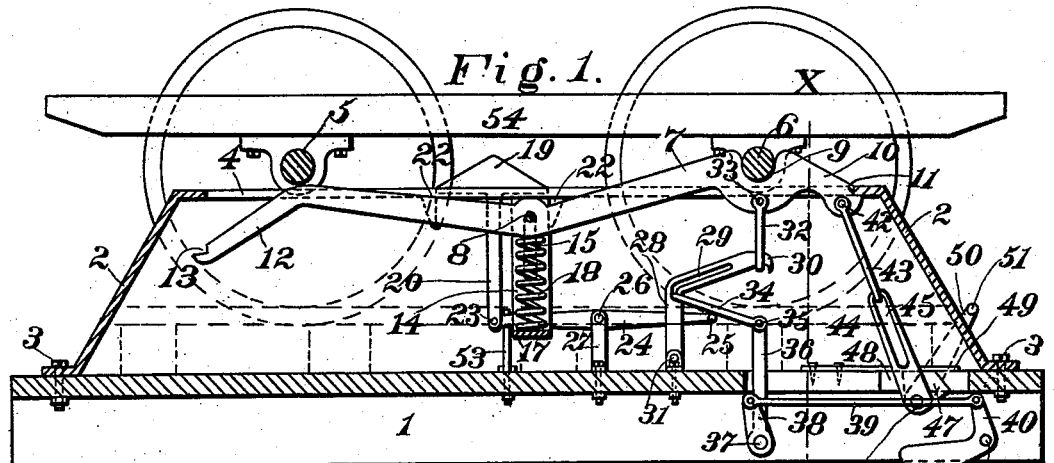
Figure 2:
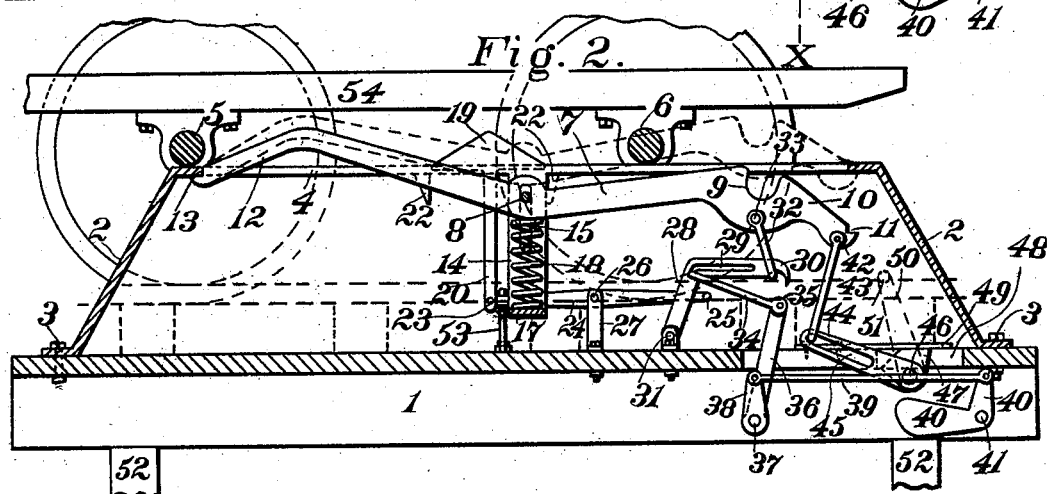
Figure 3:
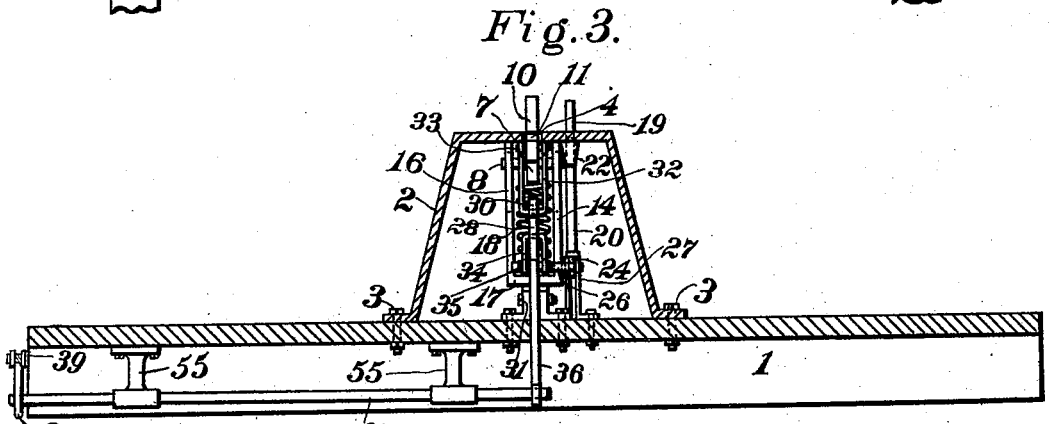

Referring to the accompanying drawings, wherein like figures designate like parts throughout the several views, Figure 1 represents a vertical mid-section view of the case inclosing the working parts, which appear in full lines. Fig. 2 represents a view similar to Fig. 1, showing the dog and other working parts in their retracted positions. Fig. 3 represents a vertical cross-sectional view upon the line X X of Fig. 1, and Fig. 4 is a top plan view showing the arrangement of the shafting leading to the trips at the sides of the cage.

Considering Fig. 1, numeral 1 designates the platform of the cage; 2 the case fixed upon the platform by bolts 3 or in any convenient manner and having the longitudinal slot 4. (See also Figs. 2, 3, and 4.) From motives of economy and expediency the case may be cast of iron and in one piece. It can, however, be as well constructed of wrought plates fashioned with flanges and bolted together in the ordinary way. The case is intended to protect the working parts from foreign bodies falling from the cars and from the danger of breakage ever present during the severe usage to which hoisting-cages are customarily subjected.

5 and 6 designate sections of the axles of a truck resting upon the platform 1.

7 designates the dog, through which is fixed the pivot 8 at the apex of a very obtuse angle, into which the body of the dog is formed.

9 designates a recess, of any chosen shape, designed to engage the axle of a truck, and 10 marks the inclined portion of the dog at the right-hand end having the notch 11, and at the left-hand end 12 marks the inclined portion with notch 13.

It will be observed that the apex of the middle angular portion of the dog is placed downward and that the upper edge or surface rises gradually in both directions from the pivot until certain points have been reached, from which points the edge declines toward the notched extremities. In passing over the dog, therefore, from either side the axles of a truck meet inclined surfaces.

14 designates one of a pair of jaws attached to the under surface of the top of the case and having a longitudinal slot 15, capable of admitting the pivot 8.

16 marks the second of the pair of jaws, Fig. 3, the slot not being shown, as it is in all respects similar to that through 14.

17 represents a cross-plate connecting the lower ends of the jaws and affording a base of support for the coiled spring 18, upon the top of which rests the middle bend of the dog.

19 designates a trip, which possesses a head, as shown in Figs. 1 and 2, of angular outline, the apex of the angle being uppermost, from which point the sides slope gradually downward to the extremities of the head. The trip is ordinarily a metal plate of suitable thickness having the contour shown and provided with the extension 20. From either direction an approaching axle will meet a plane surface of easy incline, for the purpose more fully set out hereinafter. The head 19 occupies a slot 21 in the top of case 2, parallel with slot 4, and at each end of slot 21 a block 22 is attached to the lower surface of the case-top. The blocks 22 22 are exactly similar in all respects and serve to continue the ends of slot 21 downwardly for the purpose of guiding and retaining the head 19 in proper position with regard to the slot during its reciprocative movement up and down. The trip is supported with the apex of the head normally above the case upon pivot 23, fixed through one end of lever 24. The lever has a lateral extension or finger 25 at its remaining end, Figs. 1, 2, and 4, and a fulcrum 26, borne by the standard 27, which is bolted to the floor of the cage. The arm of lever 24, bearing the finger, overbalances the weight of the remaining arm and trip 19, the angular head of the latter being thus caused to project above the case, as shown.

28 designates a bent arm having a longitudinal slot 29, a hook or notch end 30, and a pivotal connection with a standard 31, bolted to the floor of the cage. The slot 29 follows the general shape of the bend in the arm, extending for a short distance beyond the bend toward the pivoted end; but the main portion of the slot lies from the bend in the arm toward the hook end 30 in a direct line. A yoke or link 32 engages the hook end 30, and the yoke is connected with dog 7 by pivot 33. (See Figs. 1, 2, and 3.) 34 marks a similar yoke or link constructed to be passed through the slot 29 and joined by the pivot 35 to arm 36, which passes downward through a slot in the floor and is fixed upon a shaft 37, suitably supported beneath the floor by hangers 55 55 (see Fig. 3) and terminating at one side of the cage.

At the outer end of shaft 37 is fixed the crank 38, pivotally connected by link 39 with an angular trip 40, having a weighted extension and supported by pivot 41, projecting from the side of the cage. Near the end of the inclined portion 10 of the dog is fixed the pivot 42, which attaches the yoke or link 43 to the dog. An arm 44, having a slot 45, is connected with the dog by passing the yoke 43 through the slot 45 before attaching it to pivot 42. Arm 44 is fixed at the inner end of a shaft 46, which extends to the side of the cage opposite to that upon which the trip 40 is pivoted. Near the arm 44 and fixed upon the same shaft is the block 47, which operates in a slot 48 through the floor. Block 47 has its free end provided with two surfaces situated at like distances from the axis of shaft 46 and each surface lying in a plane tangent to the circumference of a circle described by a radius equal to the perpendicular distance from the axis. The surfaces meet, therefore, at a point beyond the assumed circle.

49 is a flat plate spring fixed to the floor at one end and extending over the slot 48. The block 47 is so arranged that the above-mentioned surfaces of its angular end can be brought alternately against the lower face of spring 49 by turning shaft 46. Assuming block and spring to rest together, as shown in Fig. 1, it will be understood that to turn the shaft the force of the spring must be overcome, its free end being raised as the apex of the angle of the block is forced beneath it. After the passage of the apex the spring reacts into contact with the second surface of the angular end. Limits are thus set up between which the shaft 46 and its attachments may be revolved, and a definite force is needed to throw the parts from either terminal position. The spring is chosen of such strength as will successfully resist accidental impulses given to crank or trip 50, which is fixed upon the end of shaft 46 at the side of the cage and possesses an inwardly-projecting handle or foot-piece 51.

The operation of my device may be described as follows: Normally if no truck occupies the platform the dog assumes the position indicated by broken lines in Fig. 2, excepting when the cage has reached the lowest level of the shaft and rests upon beams 52, arranged to support it. In this particular position the weighted end of trip 40 no longer drops below the cage, but has been relatively raised, and acting upon connecting-rod 39, crank 38, shaft 37, arm 36, yoke 34, bent arm 28, and yoke 32 depresses end 10 of dog 7, as appears in Fig. 2. From the right side, therefore, at the lowest level of the shaft, a truck may be pushed upon the cage, and its leading axle encounters no obstacle until the right incline of the head of trip 19 is struck. It is plain that the trip will now be pressed downward, causing the finger 25 of lever 24 to rise against yoke 34, lifting it from the short into the long portion of slot 29, whereupon end 10 of the dog rises, the coiled spring 18 overcoming the spring-plate 49 by reason of its greater strength and the superior leverage exerted through yoke 43 by way of slotted arm 44 and shaft 46 upon block 47. The second axle now finds the inclined end 10 in its path, which end gives away beneath it until recess 9 is attained, when the dog springs upward and grasps the axle, as in Fig. 1. At any other than the lowest level the foot-piece 51 of trip 50 must be acted upon to depress end 10 of the dog and permit the leading axle of the truck to pass above without engaging recess 9. When end 10 is thus lowered by the combined effort of parts 51, 50, 46, 44, and 43, the yoke 32 moves directly downward, separating from hook 30 and leaving arm 28 and trip 40, with their intermediate attachments, undisturbed.

When a truck 54, held by my invention upon a descending cage, has arrived at the lowest level, it can be pushed off the platform toward the left without opposition. This statement and that which follows will be understood upon considering Figs. 1 and 2. As the cage arrives at the lowest level the weighted trip 40 is brought down upon beam 52 before the cross-beams of the cage come to rest upon beams 52. The trip is thus caused to assume the position shown in Fig. 2, the depression of end 10 of the dog resulting, leaving axle 6 free. If the truck be moved to the left, the recess has no further opportunity of engaging either axle, both of which may pass to the left by depressing the bend of the dog near end 12. Should the truck be propelled toward the right, the contact between axle 5 and trip 19 releases the dog and raises recess 9 into position to engage the approaching axle 5 unless end 10 of the dog is again lowered by operating trip 50.

Approaching from the left-hand side at any level the leading axle of a truck depresses, first, the inclined end 12 of the dog. Then the trip 19 goes down, releasing end 10 when at the lowest level, as explained above. The pivot 8 is situated near the middle of the dog, the upper edge or surface of which rises gradually in both directions from a point near and above the pivot. As the axle advances after leaving the trip 19 the next contact is made with a rising edge of the dog, which gives away beneath it until recess 9 is raised from beneath into engagement with the axle by spring 18, as previously described. As the cage is elevated the weighted arm of trip 40 falls, turning arm 36 into substantially a vertical attitude, whereupon the bend of yoke 34 drops back into the short portion of slot 29, which is its usual situation. If while the parts occupy the relative positions shown in Fig. 1 the trip 19 is actuated by a passing axle operating lever 24 and lifting yoke 34, the hook end of arm 28 simply rises and falls and all the parts concerned resume their original places without affecting the system. In order that trip 19 may not be raised by the overbalancing-arm of the lever too far above the casing, a hook 53, attached to the floor and engaging the lever, or any other common device, can be employed.

From the above explanation of the mode of operation of my invention the method of receiving, holding, and releasing trucks arriving and departing upon either side at any level will be plainly followed.

I do not limit myself to the precise form and arrangement of parts shown, but reserve the right to vary their shapes and relations within the scope of my invention, which has been thus described in full; and

What I claim, and desire to protect by Letters Patent, is—

1. In an automatic car-holder for hoisting-cages, the combination of a platform, a suitable casing provided with longitudinal slots and adapted for attachment to said platform, a dog possessing a pivot and a recess near one end, said dog having an upper edge declining in both directions from said recess and from a point near the other end, the length of the dog exceeding that of the greater slot in said case, a coiled spring, means attached to said case for engaging and guiding said pivot and for supporting said spring, substantially as described.

2. In an automatic car-holder for hoisting-cages, the combination of a platform, a suitable casing provided with longitudinal slots and adapted for attachment to said platform, a dog possessing a pivot and a recess near one end, said dog having an upper edge declining in both directions from said recess and from a point near the other end, the length of the dog exceeding that of the greater slot in said case, a coiled spring, means attached to said case for engaging and guiding said pivot and for supporting said spring, a trip having a head with inclined sides and adapted to pass through the lesser slot in said case, means for guiding said trip and for limiting its movement, a lever, one arm of said lever adapted for pivotal attachment to said trip, the remaining arm having a lateral projection and constructed to overbalance the weight of said trip, a pivoted bent arm having a hook end and a bent slot consisting of a shorter and a longer portion, means pivoted to said dog and constructed for separable connection with the hook end of said bent arm, a yoke normally engaging the shorter portion of said bent slot, and mechanism pivotally connected with said yoke whereby the recessed arm of said dog may be automatically depressed when said platform is supported from below, substantially as described.

3. In an automatic car-holder for hoisting-cages, the combination of a platform, a suitable casing provided with longitudinal slots and adapted for attachment to said platform, a dog possessing a pivot and a recess near one end, said dog having an upper edge declining in both directions from said recess and from a point near the other end, the length of the dog exceeding that of the greater slot in said case, a coiled spring, means attached to said case for engaging and guiding said pivot and for supporting said spring, a yoke pivoted to the recessed arm of said dog, a shaft suitably supported, an arm fixed upon said shaft and having a longitudinal slot adapted to admit said yoke, and a trip fixed at the outer end of said shaft, substantially as described.

4. In an automatic car-holder for hoisting-cages, the combination of a platform, a suitable casing provided with longitudinal slots and adapted for attachment to said platform, a dog possessing a pivot and a recess near one end, said dog having an upper edge declining in both directions from said recess and from a point near the other end, the length of the dog exceeding that of the greater slot in said case, a coiled spring, means attached to said case for engaging and guiding said pivot and for supporting said spring, a yoke pivoted to the recessed arm of said dog, a shaft suitably supported, an arm fixed upon said shaft and having a longitudinal slot adapted to admit said yoke, a trip fixed upon said shaft, means for limiting the revolution of said shaft and attachments, a trip having a head with inclined sides and adapted to pass through the lesser slot in said case, means for guiding said trip and for limiting its movement, a lever, one arm of said lever adapted for pivotal attachment to said trip, the remaining arm having a lateral projection and constructed to overbalance the weight of said trip, a pivoted bent arm having a hook end and a bent slot consisting of a shorter and a longer portion, means pivoted to said dog and constructed for separable connection with the hook end of said bent arm, a yoke normally engaging the shorter portion of said bent slot, and mechanism pivotally connected with said yoke whereby the recessed arm of said dog may be automatically depressed when said platform is supported from below, substantially as described.

In testimony whereof I affix my signature in presence of two witnesses.

JULIUS ROY CAMPBELL.

Witnesses:
ELMER S. TOMLINSON,
HORATIO W. SMITH.